(12) United States Patent
McClung, III

(10) Patent No.: US 6,338,381 B1
(45) Date of Patent: Jan. 15, 2002

(54) HEAT EXCHANGE SYSTEMS

(76) Inventor: Guy L. McClung, III, 18007 Pleasantwood Dr., Spring, TX (US) 77379

( * ) Notice: Subject to any disclaimer, the term of this patent is extended or adjusted under 35 U.S.C. 154(b) by 0 days.

(21) Appl. No.: 09/620,954

(22) Filed: Jul. 21, 2000

Related U.S. Application Data

(63) Continuation-in-part of application No. 09/504,172, filed on Feb. 15, 2000, now Pat. No. 6,267,172.

(51) Int. Cl.$^7$ ............................. F21B 36/00; F21B 43/24
(52) U.S. Cl. ........................... 165/45; 166/61; 166/302; 166/303
(58) Field of Search ............................... 165/45; 166/61, 166/302, 303

(56) References Cited

U.S. PATENT DOCUMENTS

| | | | |
|---|---|---|---|
| 1,179,374 A | 4/1916 | Many ........................ | 138/149 |
| 2,859,818 A | 11/1958 | Hall et al. | |
| 3,199,588 A | 8/1965 | Holbert | |
| 3,470,943 A | 10/1969 | VanHuisen | |
| 3,609,980 A | 10/1971 | Bowers | |
| 3,630,038 A | 12/1971 | Ando ........................ | 61/72.1 |
| 3,706,872 A | 12/1972 | Trabilcy ..................... | 219/300 |
| 3,735,769 A | 5/1973 | Millar ........................ | 137/13 |
| 3,744,565 A * | 7/1973 | Brown ........................ | 166/302 |
| 3,807,491 A | 4/1974 | Val Hulsen ................... | 165/45 |
| 3,840,035 A | 10/1974 | Lefever ....................... | 137/13 |
| 3,972,193 A * | 8/1976 | Sherwood ..................... | 165/45 |
| 3,975,912 A * | 8/1976 | Greene ........................ | 165/45 |
| 4,051,677 A | 10/1977 | VanHuisen .................... | 60/641 |
| 4,106,528 A | 8/1978 | Laing ......................... | 138/149 |
| 4,201,060 A * | 5/1980 | Outmans ....................... | 165/45 |
| 4,223,729 A | 9/1980 | Foster ........................ | 166/27 |
| 4,270,600 A | 6/1981 | Bourdin ................. | 165/104.31 |
| 4,289,172 A | 9/1981 | Ekstrom ...................... | 138/149 |

(List continued on next page.)

FOREIGN PATENT DOCUMENTS

| | | |
|---|---|---|
| DE | 24 49 807 A | 4/1976 |
| DE | 30 00 836 A1 | 7/1980 |
| JP | 54-40328 | 1/1979 |
| WO | WO 94/21889 | 9/1994 |

*Primary Examiner*—Ira S. Lazarus
*Assistant Examiner*—Tho Van Duong
(74) *Attorney, Agent, or Firm*—Guy McClung

(57) ABSTRACT

A system for heating or cooling a wellhead, the system including a header in fluid communication via a pipe with a wellhead so that header heat transfer fluid is flowable from the header to the wellhead and back to the header, an earth heat exchange system with earth heat exchange fluid flowable therethrough to provide heat exchange between the earth heat exchange fluid and the earth, and the earth heat exchange fluid flowable in heat exchange relation to heat or cool the wellhead.

13 Claims, 8 Drawing Sheets

U.S. PATENT DOCUMENTS

| | | | |
|---|---|---|---|
| 4,290,266 A | 9/1981 | Twite et al. | 60/641.2 |
| 4,325,228 A | 4/1982 | Wolf | 62/260 |
| 4,357,989 A | 11/1982 | Holzle | 165/45 |
| 4,358,223 A | 11/1982 | Jahns et al. | 405/157 |
| 4,360,056 A | 11/1982 | O'Connell | 165/45 |
| 4,374,687 A | 2/1983 | Yamamoto | 156/71 |
| 4,375,831 A | 3/1983 | Downing, Jr. | 166/48 R |
| 4,399,319 A | 8/1983 | Zinn | 174/47 |
| 4,449,852 A | 5/1984 | Muszynski | 405/168 |
| 4,574,875 A | 3/1986 | Rawlings et al. | 165/45 |
| 4,679,598 A | 7/1987 | Jee | 138/103 |
| 4,711,306 A * | 12/1987 | Bobo | 166/372 |
| 4,714,108 A | 12/1987 | Barry | 165/45 |
| 4,715,429 A | 12/1987 | Mogensen | 165/45 |
| 4,720,263 A | 1/1988 | Green | 432/222 |
| 4,776,169 A * | 10/1988 | Coles, Jr. | 165/45 |
| 4,912,941 A | 4/1990 | Buchi | 62/260 |
| 4,963,420 A | 10/1990 | Jarrin et al. | 428/36.9 |
| 4,993,483 A | 2/1991 | Harris | 165/45 |
| 5,081,848 A | 1/1992 | Rawlings et al. | 62/260 |
| 5,120,381 A | 6/1992 | Nee | 156/187 |
| 5,129,236 A | 7/1992 | Solomon | 62/324.1 |
| 5,181,655 A | 1/1993 | Bruckelmyer | 237/1 R |
| 5,183,100 A | 2/1993 | Harrell, Jr. | 165/45 |
| 5,188,179 A * | 2/1993 | Gay et al. | 166/310 |
| 5,192,039 A | 3/1993 | Williams | 248/62 |
| 5,200,152 A | 4/1993 | Brown | 422/102 |
| 5,241,147 A | 8/1993 | Ahlen | 219/10.51 |
| 5,271,974 A | 12/1993 | Upchurch | 428/34.4 |
| 5,322,115 A | 6/1994 | Hildebrand | 165/45 |
| 5,462,091 A | 10/1995 | Saupe | 138/126 |
| 5,477,914 A | 12/1995 | Rawlings | 165/45 |
| 5,515,679 A | 5/1996 | Shulman | 60/641.2 |
| 5,560,220 A | 10/1996 | Cochran | 62/260 |
| 5,656,136 A | 8/1997 | Gayaut et al. | 166/302 |
| 5,706,888 A | 1/1998 | Ambs et al. | 165/155 |
| 5,911,684 A | 6/1999 | Schnell | 60/641.2 |
| 6,000,471 A | 12/1999 | Langset | 166/268 |
| 6,032,732 A * | 3/2000 | Yewell | 165/57 |
| 6,049,657 A | 4/2000 | Sumner | 392/469 |
| 6,056,057 A | 5/2000 | Vinegar et al. | 166/302 |
| 6,062,308 A | 5/2000 | Flood | 166/52 |
| 6,079,499 A | 6/2000 | Mikus et al. | 166/401 |
| 6,092,557 A | 7/2000 | Sumner | 138/149 |

\* cited by examiner

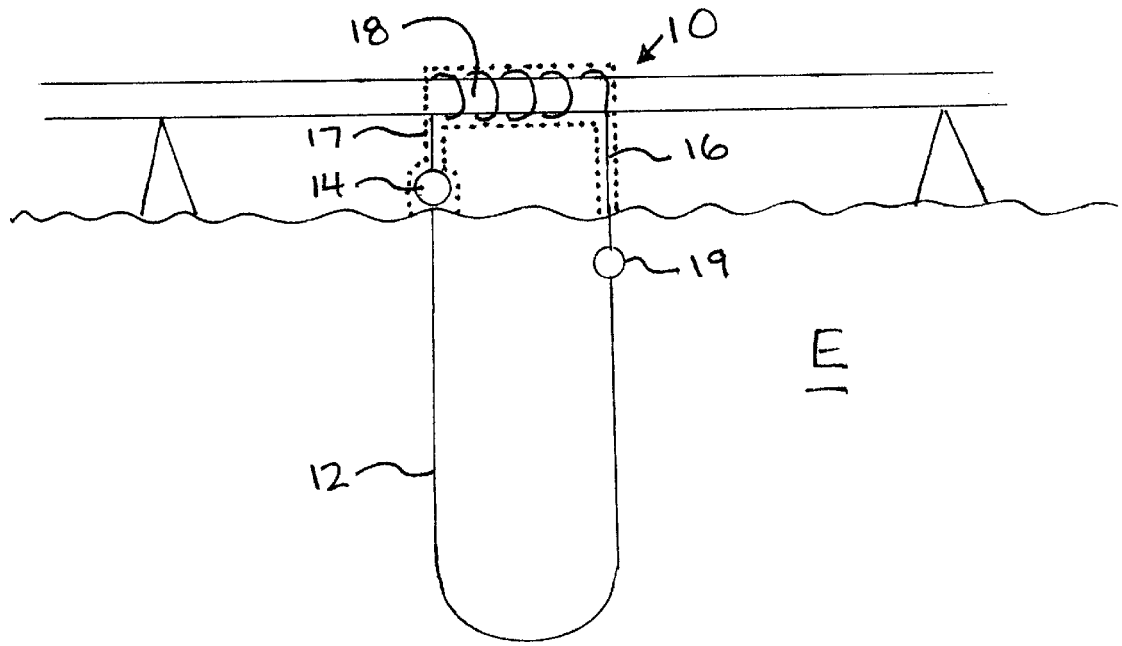
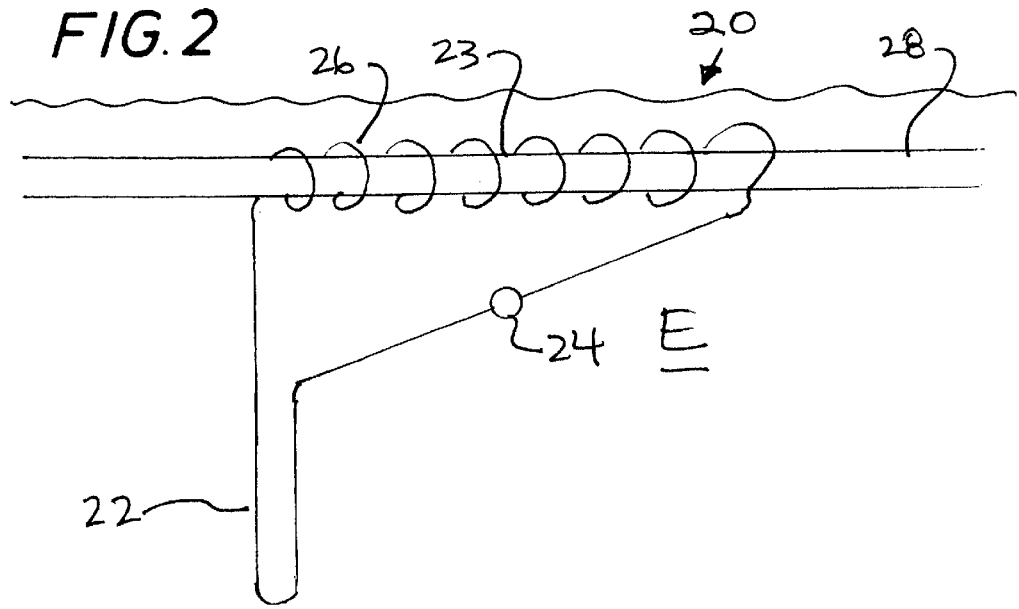

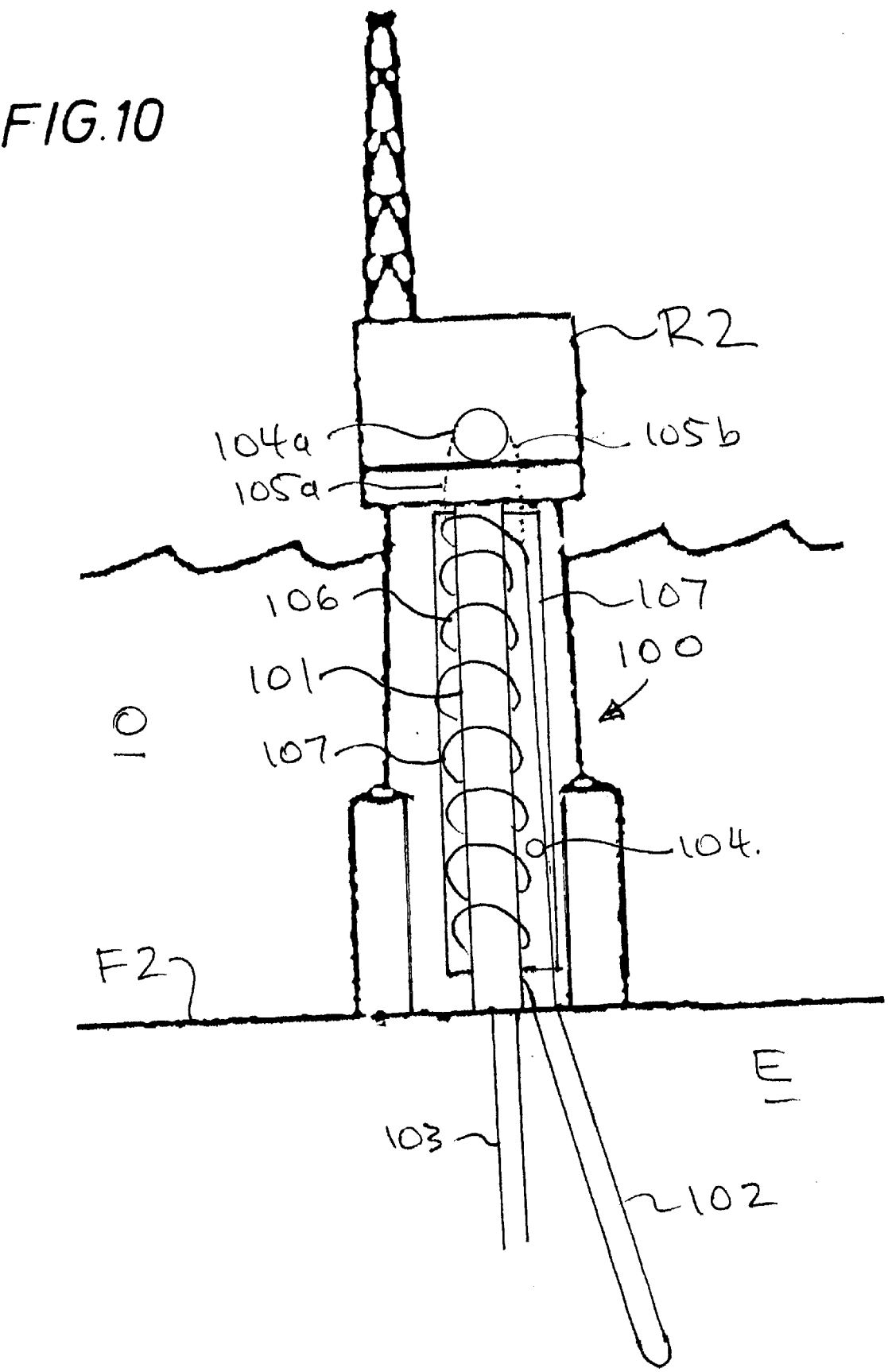

HEAT EXCHANGE SYSTEMS

RELATED APPLICATION

This is a continuation-in-part of U.S. Application Ser. No. 09/504,172 filed Feb. 15, 2000, now U.S. Pat. No. 6,267,172 incorporated fully herein for all purposes.

BACKGROUND OF THE INVENTION

1. Field of the Invention

The present invention, in at least certain embodiments, is directed to heat exchange systems for exchanging heat between an earth conduit and/or earth loop and a rig, wellhead, pipe, pipeline or riser; the systems, in certain aspects, having an earth conduit or loop and associated apparatus for transferring heat between transfer fluid circulating in the conduit or loop and the rig, wellhead, pipe, pipeline or riser.

2. Description of Related Art

The prior art discloses a wide variety of earth heat exchange systems. Typically such systems include conduit, conduits, and/or a pipe loop within the earth, apparatus for circulating heat transfer fluid therethrough and through other systems or apparatuses above the surface, and heat exchange apparatus for exchanging heat between the transfer fluid and an item, apparatus, device or other thing.

SUMMARY OF THE PRESENT INVENTION

The present invention, at least in certain preferred aspects, discloses a system for heating or cooling a rig, apparatus thereon, a pipeline (above ground, under ground, and/or under water), wellhead, pipe, wellbore or a riser, the system including an earth heat exchange conduit or loop within the earth and heat exchange apparatus for conveying heated (or cooled) transfer fluid circulating through the earth heat exchange conduit or loop to the rig, pipe, wellbore, riser, or pipeline. The heat exchange apparatus may encompass a portion of an item's exterior and/or it may include heat exchange device(s) within the item or pipeline to heat or cool fluid flowing therein.

In certain embodiments according to the present invention the heat exchange apparatus is permanently or semi-permanently installed on a pipe, rig, riser, wellhead or pipeline section. In other embodiments a movable jacket or module is used that is selectively interconnectible to one of a series of earth heat exchange conduits or loops so that a selected portion of the item or section can be heated or cooled. In another aspect a mobile heat exchange apparatus is used within a pipe, riser, or a pipeline that can be connected so that it is in fluid communication with an earth heat exchange system nearby. In certain embodiments one or more flow rate control devices are used within a conduit or loop to control and/or maintain fluid flow rate through a portion thereof.

In one aspect an earth conduit or loop is provided that has a portion thereof that is insulated. In another aspect one or more valves and/or one or more flow rate control devices are used in an earth conduit or loop to control fluid flow rate therein and/or to selectively flow heat transfer fluid through a selected portion of a loop or conduit.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious devices and methods for transferring heat between a rig, wellhead, or pipeline and heat transfer fluid circulating through an earth conduit or loop;

Such devices and methods wherein a heat exchange device is selectively emplaceable at a desired location and removably interconnectible with one, two, three, or more or a series of a plurality of earth conduits and/or loops;

Such devices and methods with remotely controlled controllers, pumps, etc;

Such devices and methods with pumps, etc. powered with a solar power system and/or a wind power system;

Such devices and methods for a portion of a pipeline above ground and/or below ground;

Such devices and methods with a heat exchange device on the outside of or within a pipeline;

Such devices and methods with a heat exchange device movable within a pipeline;

Such devices and methods with a heat exchange device within a wellbore, the device in fluid communication with an earth conduit or loop;

Such devices and methods with an earth conduit or earth loop having an insulated portion to enhance heat transfer efficiency; and Such devices and methods with one or more pumps, valves, and/or flow control devices in an earth conduit or loop, or in part thereof, or in an earth loop with one or more crossover portions.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1 is a schematic view in cross-section of a system according to the present invention.

FIG. 2 is a schematic view in cross-section of a system according to the present invention.

FIG. 10 is a schematic view in cross-section of a system according to the present invention.

DESCRIPTION OF EMBODIMENTS PREFERRED AT THE TIME OF FILING FOR THIS PATENT

Figure 3:
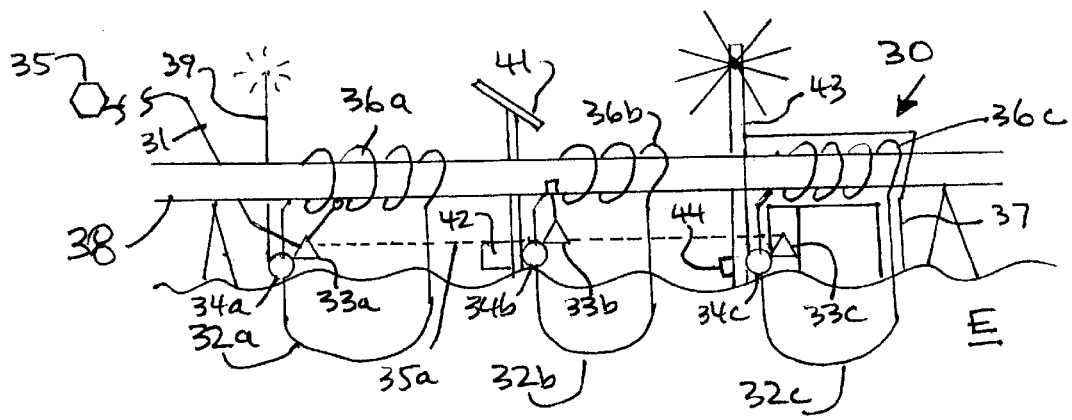
FIG. 3 is a schematic view in cross-section of a system according to the present invention.

Referring now to FIG. 1, a system 10 according to the present invention includes an earth heat loop 12 made of any suitable conduit or pipe material through which a heat transfer fluid can be circulated. The loop 12 extends down into the earth E to a desired depth, e.g., but not limited to, a depth at which the temperature of the earth is between 60° F. and 80° F. Higher (and lower) temperatures can often be encountered at various depths in the earth and any loop (or earth conduit) disclosed herein may extend to such depths as desired.

A pump 14 pumps the heat transfer fluid through the loop 12 and through a heat exchange apparatus, e.g. but not limited to, a conduit 16, a portion of which encompasses a portion of a pipeline 18 through which fluid flows. Alternatively, or in addition to the pump 14, a pump 19 beneath the earth's surface pumps fluid through the loop 12 and the conduit 16. The conduit 16 is in fluid communication with the loop 12 so that heat transfer fluid is pumped through the loop 12 to the conduit 12, and back through the loop 12 continuously.

In situations in which the temperature of the environment of the pipeline is relatively cold, e.g. but not limited to 32° F. or below, or 0° F. or below, the heat transfer fluid is pumped through a loop 12 to a sufficient depth and the loop is of sufficient length that the fluid is warmed and then, by heat exchange, warms the portion of the pipeline 18 and, hence, fluid within that portion of the pipeline. The conduit 16 can be any desired length. Optionally, insulation 17 is provided around the conduit 16 and/or the pump 14. Also, as described below, part of the loop under the earth's surface may be insulated. In situations in which the pipeline's environment is relatively hot, e.g., but not limited to 100° F. or hotter, the heat transfer fluid at a cooler temperature, e.g. between about 70° F. to 80° F., can be used to cool, by heat exchange, the portion of the pipeline 18 encompassed by the conduit 16.

FIG. 2 illustrates a system 20 according to the present invention in which a pipeline 28 is buried in the earth E. An earth loop 22 has a lower portion in fluid communication with an upper heat exchange portion 26 that encompasses a part 23 of the pipeline 28. The part 23 of the pipeline 28, and hence fluid in that part of the pipeline, may be at one temperature while heat transfer fluid with a pump 24 pumped through the loop 22 is of a different temperature. Thus, as with the system 10, by circulating heat transfer fluid through the loop 22 and the conduit 26 the part 23 of the pipeline can be cooled or heated, depending on the temperature differential of the earth adjacent the loop 12 and adjacent the part 23 of the pipeline, and depending on the temperature of fluid flowing through the pipeline. Alternatively, a portion of the conduit 26 or loop 22 can extend above the earth surface and a pump can be positioned there to circulate fluid through the loop and the conduit. Either a sufficient length of conduit 16 or 26 are used, or an appropriate heat exchange apparatus in fluid communication with the conduit is used, to effect a desired temperature change for a pipeline portion and/or fluid flowing through the pipeline portion.

FIG. 3 illustrates a system 30 for a pipeline 38 above the earth E that includes three earth loops 32a, 32b, 32c which extend down into the earth E to a desired depth which is at a desired temperature. Associated with and in fluid communication with each earth loop is a heat exchange apparatus, e.g., but not limited to conduits 36a, 36b, 36c each of which is in fluid communication with a corresponding earth loop. It is within the scope of this invention for the pipeline 38 to be buried in the earth. It is within the scope of this invention to have any desired number of spaced-apart earth loops in proximity to and/or along the length of the pipeline.

A cable 31 interconnects a control apparatus 33a for a pump 34a with a control function 35 that may be near the pipeline or located remotely with respect to it. Another cable 35a interconnects the control apparatus 33a with other control apparatuses 33b and 33c. The control function can selectively activate or deactivate any, all, or any combination of the pumps 34a, 34b, 34c to selectively heat (or cool) portions of the pipeline 38 corresponding to the conduits 36a, 36b, 36c.

A sensor 39a in communication with the control apparatus 33a signals the temperature of the pipeline 38 to thermostat apparatus and associated devices in the control apparatus 33a to activate or deactivate the pump 34a at desired pre-set pipeline temperatures and/or via the cable 31 temperature information is conveyed to the control function 35 and subsequent activation or deactivation of the pump 34a is accomplished (and, hence, corresponding heating or cooling of the pipeline and its contents via the conduit 36a). Such a sensor (like the sensor 39a) and related apparatus may be used with each of the pumps 34b and 34c and their control apparatuses.

Sensor 39b is connected to the control apparatus 33b and operates in a manner similar to that of the sensor-39a/ controller 33a combination; but the sensor 39b is inside the pipeline 38. A sensor 39b and related apparatus may be used with each of the pumps 34a, 34c and their control apparatuses.

Alternatively (or in addition to the cable 31) signals and data may be transmitted to and from the system 30 using wireless communication and associated transmitters and receivers at a control function (like the control function 35) and in the control apparatuses 33a, 33b, 33c, e.g. but not limited to, via one or more antennas 39.

A suitable enclosure and/or insulation material 37, shown enclosing the conduit 36c and related apparatuses, may be used with the conduits 36a, 36b and related apparatuses.

Power for the pumps and control apparatuses of the system 30 may be provided via suitable cables or lines. Alternatively, or in addition to such power, a solar collector 41 with storage batteries 42 may be used to provide power for the system 30 and/or a wind-driven power generating system 43 with storage batteries 44 may be used. It is within the scope of this invention to provide such power source systems for any earth heat loop transfer system whether used with a pipeline or not.

Figure 4:
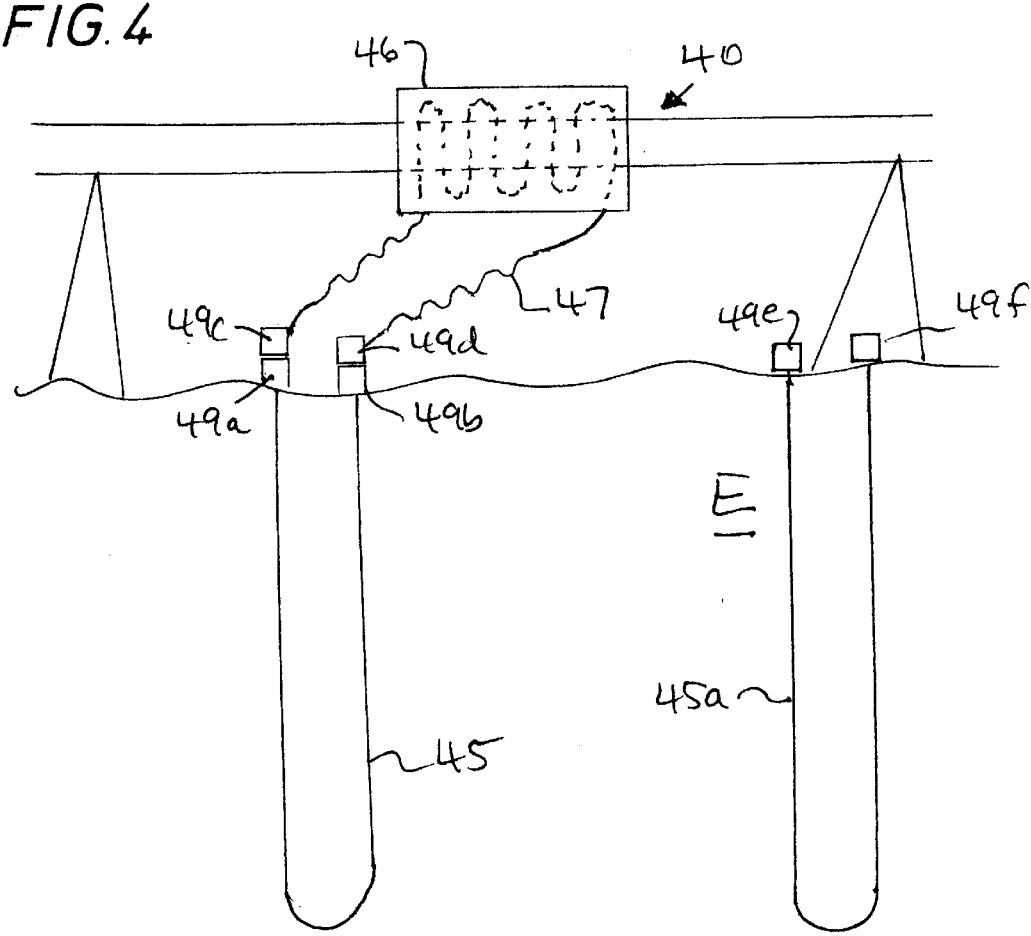
FIG. 4 is a schematic view in cross-section of a system according to the present invention.

FIG. 4 shows a system 40 according to the present invention which has an earth loop 45 through which heat transfer fluid circulates (e.g. by a pump or pumps, not shown) which is in fluid communication with a transfer fluid line 47 of a movable heat exchange tube or jacket 46 in position on a portion of a pipeline 48 above the earth E. The tube or jacket 46 can, according to the present invention, be configured and fashioned to completely encircle a portion of a pipeline or to cover only a part of its full circumference. Connection 49a, 49b on the loop 45 and connections 49c, 49d on the line 47 make it possible to disconnect the line 47 from the loop 45 and to re-connect the line 47 to connections 49e, 49f of another loop 45a so that the line 47 is then in fluid communication with the loop 45a and heat transfer fluid can be circulated (e.g. with a pump or pumps, not shown) through the loop 45a and the tube or jacket 46. It is within the scope of this invention to use any desired number of earth loops 45 and/or 45a in the system 40; and/or to use a plurality of loops of different depths to access earth areas of different temperatures to apply heat transfer fluids at one selected temperature to the pipeline.

Figure 5:
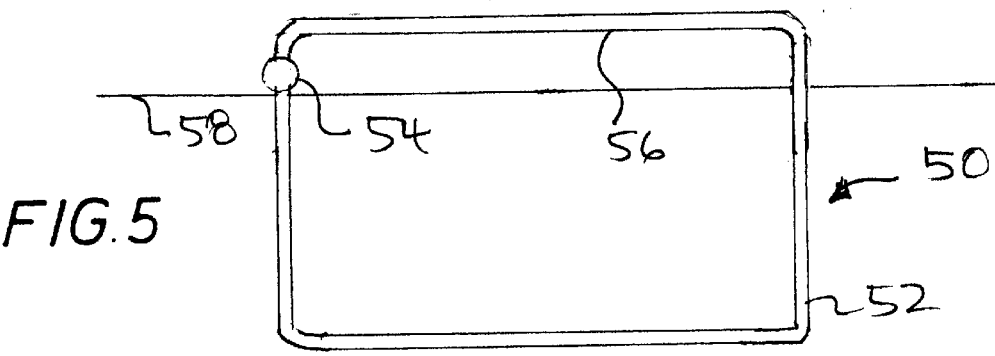
FIG. 5 is a schematic view in cross-section of a system according to the present invention.

FIG. 5 illustrates a system 50 with a pipeline 58 (which is either above ground or buried in the earth). An earth loop 52 (which is either completely buried in the earth and extends to a desired depth or has at least a portion buried in the earth and extending down to a desired depth which is at a desired temperature) is in fluid communication with a heat exchange apparatus 56, which, in one aspect, is a conduit in fluid communication with the loop 52. A pump 54 circulates fluid through the apparatus 56 and the loop 52. A pump may also be used outside the pipeline 58 to accomplish this circulation. The system 50, thus, heats (or cools) fluid flowing in the pipeline 58. Any loop disclosed herein may, similarly, be interconnected with an apparatus within a pipeline like the apparatus 56.

Figure 6:
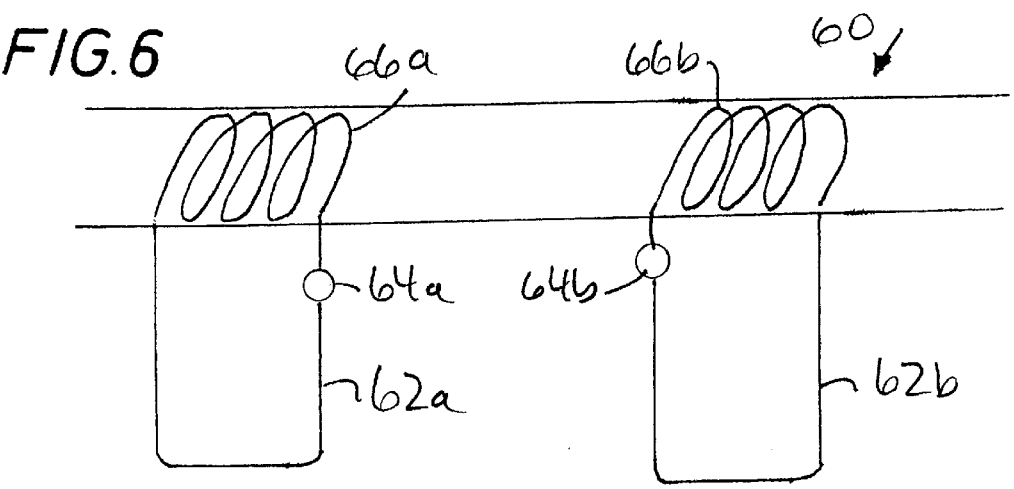
FIG. 6 is a schematic view in cross-section of a system according to the present invention.

FIG. 6 shows a system 60 with a plurality of conduits 66a, 66b, in a pipeline 68. Each conduit 66a, 66b is in fluid communication with a corresponding earth loop 62a, 62b, part or all of which is buried in the earth down to a desired depth (as may be the pipeline 68). Pumps 64a, 64b, respectively circulate heat transfer fluid through their respective conduit/loop combinations. It is within the scope of this invention to provide a plurality of such conduit/loop combinations in a pipeline or portion thereof.

Figure 7:
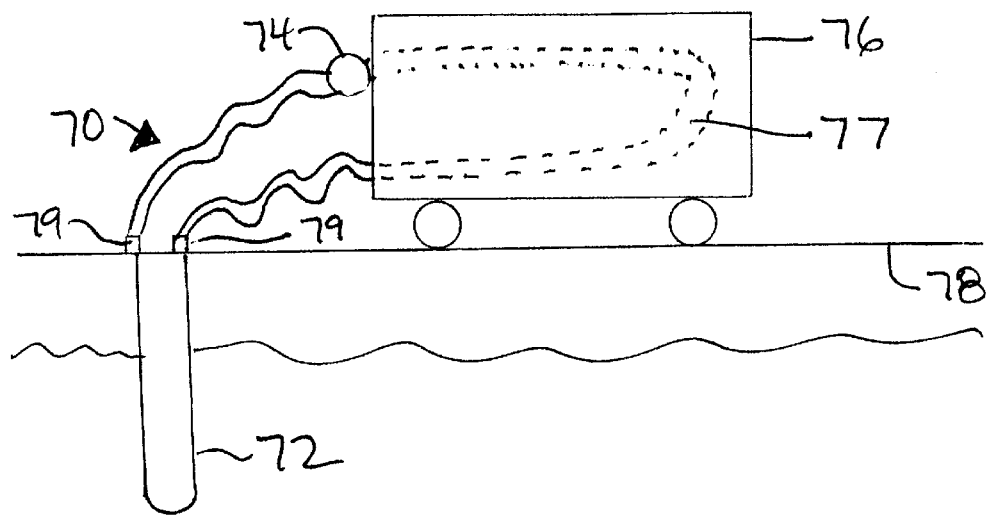
FIG. 7 is a schematic view in cross-section of a system according to the present invention.

FIG. 7 illustrates a system 70 according to the present invention which has a mobile heat exchange apparatus 76 movable disposed within a pipeline 78. A line 77 partially within the apparatus 76 is, via connectors 79, in fluid communication with an earth loop 72. A pump 74 (which may be located outside the pipeline) circulates heat transfer fluid through the loop 72 and line 77. The apparatus 76 may be motorized and remotely controllable so that it may be selectively positioned at a desired location in the pipeline 78. The line 77 may be of any suitable length to allow the apparatus 76 to reach a desired point within the pipeline with respect to the connectors 79. In another aspect the pipeline is provided with a series of spaced-apart connectors 79, each associated with an earth loop and/or a series of spacedapart earth loops adjacent the pipeline. A remote-controlled apparatus 76 is selectively movable to any desired set of connectors within the pipeline at which a connection is made of the line 77. The apparatus 76 then engages in a heat exchange operation within the pipeline—either in an evacuated pipeline or in a pipeline with fluid flowing, frozen, or partially frozen therein.

Figure 8:
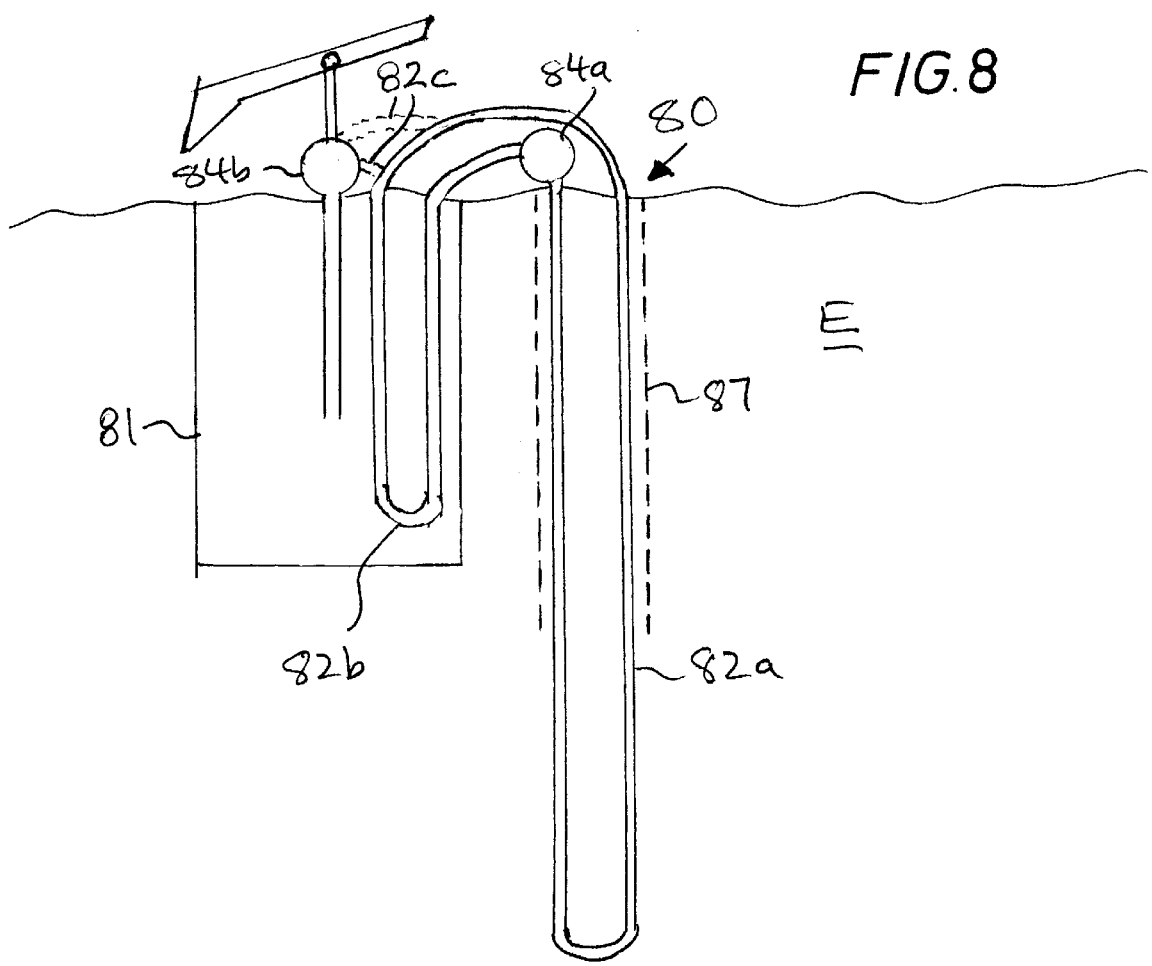
FIG. 8 is a schematic view in cross-section of a system according to the present invention.

FIG. 8 illustrates a system 80 according to the present invention which includes an earth loop 82a through which heat transfer fluid is circulated by a pump 84a. The earth loop 82a is in fluid communication with a well loop 82b which extends down into a well 81 in the earth E (which may be any type of well). Optional pumping apparatus 84b pumps fluid out of the well 81. Due to a temperature differential between the earth at a lower end of the loop 82a and the interior of the well 81, the heat transfer fluid circulated through the loops 82a and 82b heats (or cools) the interior of the well 81 facilitating operations within the well 81, including, but not limited to facilitating the operation of systems, devices, and apparatuses within the well 81. Optionally via a conduit 82c heat transfer fluid may be circulated to and from the apparatus 84b. Optionally insulating material 87 and/or an insulating enclosure may be used on any part of parts of the loop 82a (as with any loop disclosed herein). Also, any of the above-ground apparatus and equipment may also be insulated. Any of the heat exchange systems disclosed herein (e.g. but not limited to those of FIGS. 1–8) may be used to provide heat transfer fluid to a heat exchange system which then heats or cools a pipeline, rather than to such a system that is directly in contact with a pipeline as in FIGS. 1–8.

Figure 9A:
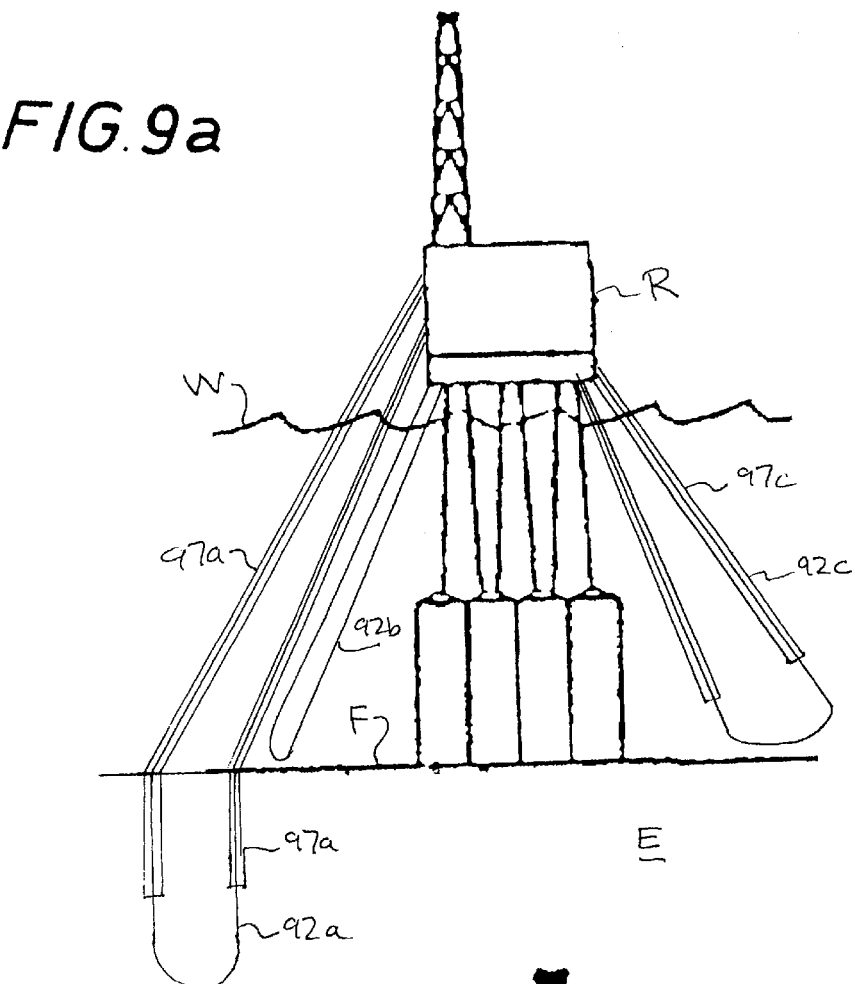
FIGS. 9A and 9B are schematic views in cross-section of systems according to the present invention.

FIG. 9A shows a system 90 according to the present invention for an offshore rig R above the ocean floor F. (Of course, it is within the scope of the present invention to use a system 90, or any earth conduit or loop and associated apparatuses and devices, with a land rig.) A plurality of heat transfer loops 92a, 92b, 92c (any one or two of which may be deleted) are operatively connected to the rig R to supply heat transfer fluid of different temperatures for use on the rig R. The loops extend down below a water surface W.

Figure 9B:
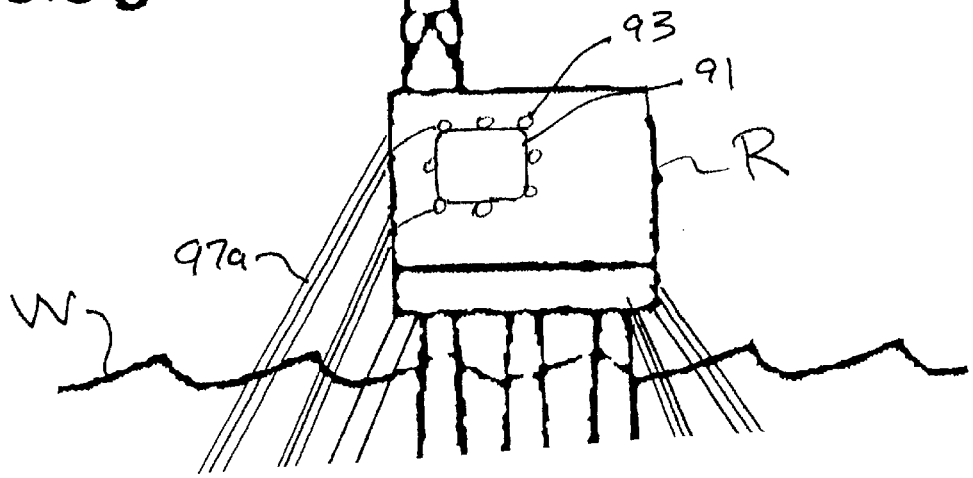

The loops 92b and 92c extend only down into the water and do not extend into the earth E below the ocean floor. Part of the loop 92c is insulated with insulation 97c so that heat transfer fluid circulated through the loop 92c is primarily exposed to the temperature of the water near the ocean floor F. Appropriate pumps and control apparatuses (not shown) for all the loops are on the rig R. The loop 92a is within the earth and is insulated with insulation 97a both in the water and down to a certain depth in the earth, insuring that heat transfer fluid circulated through this loop is primarily exposed to a temperature at a desired depth in the earth. FIG. 9B shows an addition to the system 90 of FIG. 9A which includes a series of heat exchange tubes 93 around a room 91 (or apparatus) on the rig R. The tubes 93 are in fluid communication with the heat transfer loop 92a so that heat exchange fluid flowing therein and through the tubes 93 may heat or cool the room 91 (or apparatus). Any, some or all of the loops 92a, 92b, and/or 92c may be used for heat exchange with the room 91. The rig R may be a land rig and then all the loops 92a, 92b, 92c would extend into the earth.

FIG. 10 shows a system 100 according to the present invention for a rig R2 (like the rig R) in the ocean O above an ocean floor F2. A production riser or a tubular 101 extends down from the rig R2 to a well 103 in the earth E. An earth loop 102 is in fluid communication with a heat exchange apparatus 106 that encompasses the riser or tubular 101 so that a pump 104 can pump the heat transfer fluid through the loop 102 and through the apparatus 106. Optionally, a pump 104a on the rig R2 can be used to pump the heat transfer fluid via conduits 105a, 105b in fluid communication with the apparatus 106. The apparatus 106 may be insulated with insulation 107.

Figure 11:
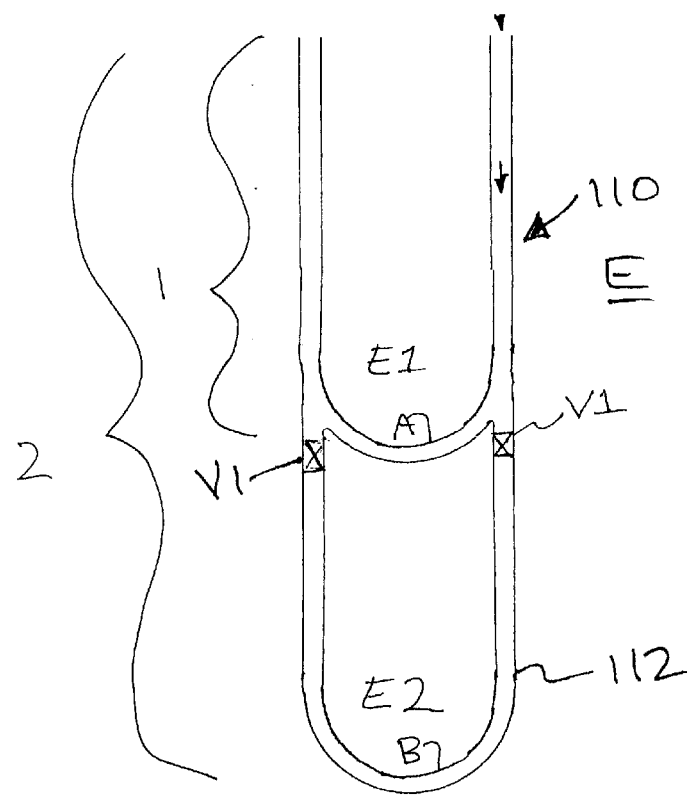
FIG. 11 is a schematic view in cross-section of a system according to the present invention.

FIG. 11 illustrates a system 110 according to the present invention which includes an earth loop 112 in the earth E having a crossover portion A at an earth depth E1 and a lowermost portion B at a different earth depth E2. Valving apparatuses V1 initially preventing fluid flow down to the lowermost loop portion B are activatable in response to fluid pumped at a pre-determined rate. For example, when heat transfer fluid is pumped through the loop 112 (with a pump or pumps, not shown) at a rate lower than the predetermined rate, it flows through the loop portion A and is exposed to the earth's temperature at the depth E1. When fluid is pumped at or above the pre-determined rate, the valving apparatuses V1 open and the heat transfer fluid flows through the loop portion B and is exposed to the earth's temperature at the depth E2.

Figure 12:
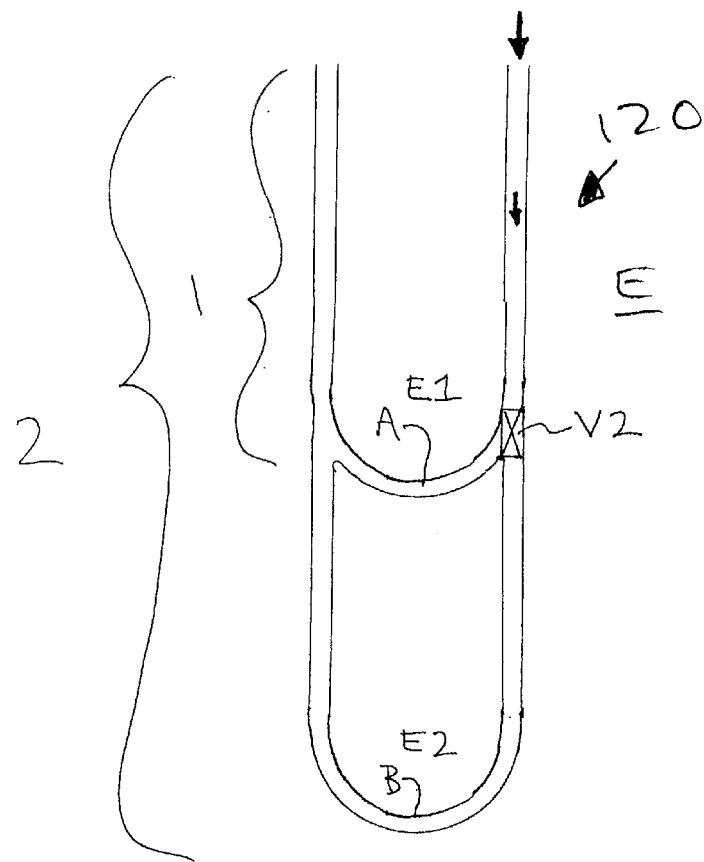
FIG. 12 is a schematic view in cross-section of a system according to the present invention.

FIG. 12 illustrates a system 120, like the system 110, and like numerals and symbols indicate the same items and things; but the valving apparatuses V1 are deleted and a single valving apparatus is used that selectively allows flow either through the loop portion A (while closing off flow to the loop portion B) or through the loop portion B (while closing off flow through the loop portion A). It is within the scope of this invention to provide any earth loop herein with two or more crossovers, like the crossover portion A, and corresponding valving apparatus so that two, three, four or more portions of an earth loop are selectively accessible, thereby making it possible to access an earth depth at a desired temperature for heat transfer. Also, according to the present invention any portion of any such loop may be insulated to enhance heat transfer efficiency at a desired earth depth.

Figure 13:
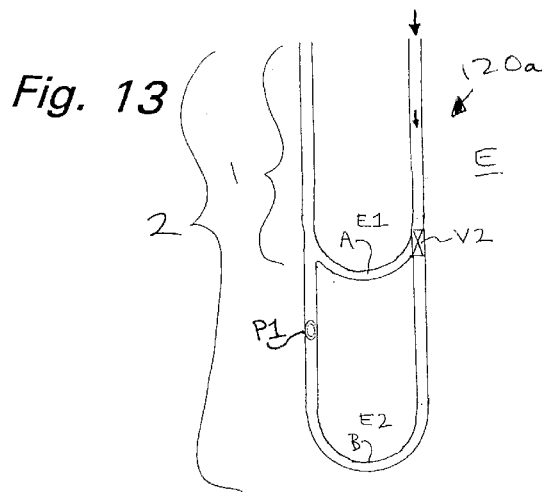
FIG. 13 is a schematic view in cross-section of a system according to the present invention.

FIG. 13 discloses a system 120a, like the system 120 (and like identifying letters and numerals identify like parts), with a pump P1 within the loop for pumping fluid through the loop. Such a pump may be disposed at any desired location in the loop and used with any loop disclosed herein. Such a pump may be remotely activated via appropriate wiring extending from the pump to the surface or the pump may be activated via a wireless system.

Figure 14:
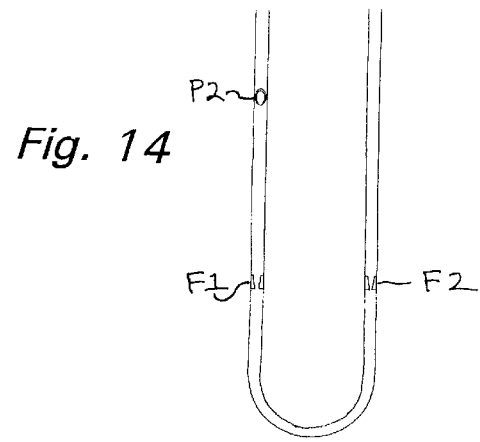
FIG. 14 is a schematic view in cross-section of a system according to the present invention.

FIG. 14 illustrates a system 140 according to the present invention which has an earth heat loop within the earth having one or more flow control devices F1 and/or F2 for controlling fluid flow in the loop or a part thereof. In certain embodiments such a flow control device (or devices) insures that heat transfer fluid moves at an optimum rate through a loop portion to optimize heat transfer between the fluid and the earth. Any suitable flow control device may be used, including, but not limited to, known restricted opening flow restrictors, and commercially available Flosert devices from Lee Company.

Any earth loop in any system or method according to the present invention may be, but is not limited to, any earth heat exchange loop as disclosed in U.S. Pat. Nos. 5,590,715; 5,758,724; 5,244,037; 5,261,251; 5,671,608; 5,477,914; 5,706,888; and in Swiss Patent CH 653120A5—all such patents incorporated fully herein for all purposes. Although various preferred embodiments of the present invention are described above as using earth loops, it is within certain embodiments of the present invention to use an earth heat exchange system, e.g., but not limited to, as disclosed in U.S. Pat. Nos. 4,448,237, 4,286,651; 4,574,875; 4,912,941; 3,609,980; 4,325,228; 5,183,100; and 5,322,115 (all such patents incorporated fully herein for all purposes) through which to circulate heat transfer fluid for heat exchange with a pipeline, rig, riser, etc. according to the present invention.

The present invention, therefore, provides in certain, but not necessarily all embodiments, a method for exchanging heat between a pipeline through which fluid is flowable and an earth conduit through which heat transfer fluid is flowable flows, the method including flowing heat transfer fluid through a first earth conduit extending from an earth surface down into the earth and having a first conduit portion in the earth at a desired location with a desired earth temperature; emplacing heat exchange apparatus with respect to a pipeline portion of a pipeline, the heat exchange apparatus including a heat exchange device for exchanging heat with the pipeline and connection apparatus, connecting the connection apparatus in fluid communication with the heat exchange device and the first earth conduit; and flowing the heat transfer fluid through the first earth conduit and then in heat exchange relation with the heat exchange device to transfer heat between the pipeline portion and the heat transfer fluid. Such a method may include one, some or (in any possible combination) of the following: flowing fluid through the pipeline, and exchanging heat between fluid flowing through the pipeline and the heat transfer fluid; wherein the first earth conduit is a loop with an inlet through which heat transfer fluid enters the earth conduit and an outlet from which the heat transfer fluid exits the conduit; pumping the heat transfer fluid through the first earth conduit and through the heat exchange apparatus with pump apparatus; powering the pump apparatus with power generated by a solar power system; powering the pump apparatus with power generated by a wind power system; controlling the pump apparatus from a location remote from the pipeline; wherein the heat exchange device is on an exterior of the pipeline; wherein the heat exchange device is within the pipeline; wherein the first earth conduit is within a first earth bore extending down into the earth and the heat exchange device is within a wellbore spaced-apart from the first earth bore, the method also including exchanging heat between an interior of the wellbore and heat transfer fluid flowing through the heat exchange device in the wellbore; wherein a portion of the first earth conduit is insulated to enhance heat transfer efficiency between the heat transfer fluid and the heat exchange device; controlling rate of fluid flow within the first earth conduit with a flow rate controller within the first earth conduit; wherein the first earth conduit has at least two loop portions each in fluid communication with the first earth conduit for the flow therethrough of heat transfer fluid and valve apparatus controls fluid flow to the at least two loop portions, the at least two loop portions spaced apart from each other and at different levels at different temperatures in the earth, the method including selectively flowing heat transfer fluid through only one of the at least two loop portions; wherein the pipeline portion of the pipeline is underwater, above ground, or underground; wherein the pump apparatus is underwater, above ground or under ground; and/or the method including stopping heat transfer fluid flow, disconnecting the connection apparatus, re-connecting the connection apparatus between a second portion of the pipeline and a second earth conduit extending from an earth surface down into the earth and having a second conduit portion in the earth at a desired location with a desired earth temperature, and flowing the heat transfer fluid through the second earth conduit to the heat exchange device.

The present invention, therefore, provides in certain, but not necessarily all embodiments, a method for providing heat transfer fluid to a rig (offshore or land) involved in wellbore operations for exchanging heat between the rig (and/or apparatus or structure on the rig) and a conduit extending from the rig, the conduit extending through material having at least two areas of different temperature, the method including flowing heat transfer fluid through the conduit and to and through heat exchange apparatus on the rig, and insulating a portion of the conduit in at least one of the at least two areas of different temperature to enhance heat transfer efficiency between the heat transfer fluid and the heat exchange apparatus; wherein the rig is an offshore rig and the material includes water adjacent the rig; wherein the rig is an offshore rig and the material includes water adjacent the rig and earth below the water; wherein the rig is an offshore rig and the heat exchange apparatus includes a heat exchange device for exchanging heat between the heat transfer fluid and a riser extending down from the rig.

The present invention also discloses, in at least certain embodiments, systems for use in such methods.

Figure 15:
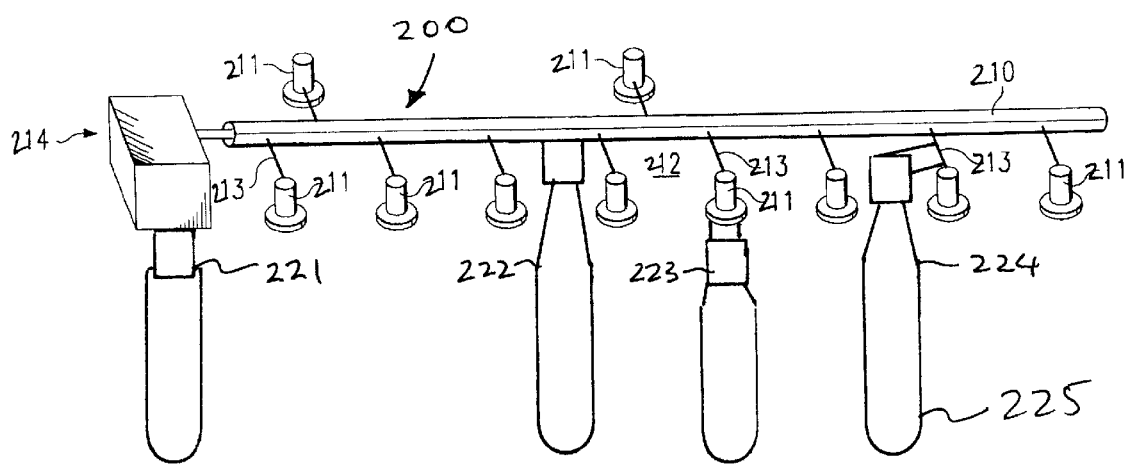
FIG. 15 is a schematic view of a system according to the present invention.

FIG. 15 shows a system 200 according to the present invention which has a header 210 which distributes or collects fluids between a plurality of spaced terminals 11 and a centralized point or facility 14. While terminals 11 (only some are numbered for clarity) can be any station or structure to which fluids are to be distributed and/or collected, they are illustrated in FIG. 15 as wellheads of production/injection wells which, in turn, have been drilled and completed at spaced locations on the earth's surface 12. As will be understood by those skilled in this art, the spacing of the wellheads 11, as shown in FIG. 15, is for illustration purposes only is not necessarily to scale. This spacing between wellheads 11 in actual field applications may vary from about 8 feet or less up to 120 feet or more.

As shown in FIG. 15, all of the wellheads 11 are fluidly connected to a single manifold or header 10 by means of respective lateral pipes 13. Where the wells are producing wells, the production fluids (e.g. oil, gas, and/or water) from a particular well flow through its wellhead 11 and lateral pipe 13 into header 10. The fluids commingle within the header 10 and flow through the header to a centralized location 14 for further handling. Where the wells are injection wells, the reverse is true. That is, an injection fluid (e.g. water for disposal or for use in water-flooding operations) flows from centralized location 14, through header 10, and out into each of the wellheads 11 through its respective lateral pipe 13. Of course, it should be understood that certain wellheads 11 can be shut-in when the situation dictates and fluids will be produced or injected through only those wellheads that are open (i.e. on-line).

One of the lateral pipes 213 is shown in fluid communication with an earth heat transfer system 224 which can either cool or heat the lateral pipe 213, and/or fluid therein, depending on the earth temperature adjacent part of a heat transfer conduit or loop 225. The system 224 may be any earth heat transfer system with any conduit or loop disclosed herein with any associated apparatuses, heat exchangers, pumps, equipment and/or devices disclosed herein. The header 210 may be any suitable header, including, but not limited to, a header as disclosed in U.S. Pat. No. 6,062,308 issued May 16, 2000 and incorporated fully herein for all purposes.

An earth heat transfer system 223 (like the system 224) is in direct communication with one of the terminals or wellheads 211 and provides heating or cooling of the wellhead and/or of fluid therein. Any lateral pipe 213 (or all of them) may have a heating/cooling system 224 or the system 224 may be in communication with more than one lateral pipe 213. Also, each terminal or wellhead 211 may be in fluid communication with its own system 223 or the system 223 as shown may be in communication with more than one terminal or wellhead.

An earth heat transfer system 222 (like the system 224) is in communication with the header 210 and provides for heating or cooling of fluid flowing in the header 210 and/or of the header itself.

An earth heat transfer system 221 (like the system 224) is in communication with the central facility 14 and can heat or cool part thereof and/or fluid therein. Alternatively, or in addition to these functions, fluid flowing from the central facility 14 to the header 210 may be heated or cooled by the system 221.

Optionally, any, some in any combination, or all (but one) of the systems 221–224 may be eliminated from the system 200. It is within the scope of this invention for the fluid flowing through the header to also be the fluid flowing through a loop or conduit of an earth heat exchange system (and similarly for the wellhead(s), pipes, and/or central terminal or facility). Also, as described herein, any portion (s) or section(s) of a loop or conduit of an earth heat exchange system of FIG. 15 may be insulated so that fluid of a desired temperature is provided for heat exchange with the header, pipe, wellhead(s), and/or central facility.

The present invention, provides, therefore, in some (but not necessarily all) embodiments, a system for heating or cooling a wellhead, the system including a header in fluid communication via a pipe with a wellhead (or directly with the wellhead with the pipe omitted) so that header heat transfer fluid is flowable from the header through the pipe (if it is present), to the wellhead and back through the pipe to the header, an earth heat exchange system with earth heat exchange fluid flowable therethrough to provide heat exchange between the earth heat exchange fluid and the earth, and the earth heat exchange fluid flowable in heat exchange relation to heat or cool the wellhead and/or fluid in it. Such a system may include one or some (in any possible combination) of the following: the earth heat exchange fluid flowable in heat exchange relation to heat or cool the header; wherein heating or cooling the header effects corresponding heating or cooling of the header heat transfer fluid; wherein heating or cooling the header effects corresponding heating or cooling of fluid in the wellhead; the earth heat exchange system fluid flowable in heat exchange relation to heat or cool the pipe; wherein heating or cooling the header effects corresponding heating or cooling of fluid in the pipe; a central facility in fluid communication with the header, pipe, and/or wellhead; the earth heat exchange system fluid flowable in heat exchange relation to heat or cool the central facility; wherein heating or cooling the header effects corresponding heating or cooling of fluid in the central facility; and/or wherein the fluid in the central facility is header heat exchange transfer fluid flowing to and through the central facility.

The present invention, provides, therefore, in some (but not necessarily all) embodiments a system for heating or cooling a plurality of wellheads, the system including a header in fluid communication via a plurality of pipes with each wellhead of the plurality of wellheads so that header heat transfer fluid is flowable from the header to the wellheads and back to the header, an earth heat exchange system with earth heat exchange fluid flowable therethrough to provide heat exchange between the earth heat exchange fluid and the earth, and the earth heat exchange fluid flowable in heat exchange relation to heat or cool each wellhead.

The present invention, provides, therefore, in some (but not necessarily all) embodiments a method for heating or cooling at least one wellhead, the method including flowing earth heat exchange fluid of a system in heat exchange relation to effect heating or cooling of the at least one wellhead, the system having a header in fluid communication via a (optional) pipe with a wellhead so that header heat transfer fluid is flowable from the header to the wellhead and back to the header, an earth heat exchange system with earth heat exchange fluid flowable therethrough to provide heat exchange between the earth heat exchange fluid and the earth, and the earth heat exchange fluid flowable in heat exchange relation to heat or cool the wellhead; and such a method wherein the at least one wellhead is a plurality of wellheads each in fluid communication with the header.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A system for heating or cooling a wellhead of a producing well, the system comprising
    a header in fluid communication via a pipe with a wellhead of a producing well so that header heat transfer fluid is flowable from the header through the pipe to the wellhead and back through the pipe to the header,
    an earth heat exchange system with earth heat exchange fluid flowable therethrough to provide heat exchange between the earth heat exchange fluid and the earth, and
    the earth heat exchange fluid flowable in heat exchange relation to heat or cool each wellhead.

2. The system of claim 1 further comprising the earth heat exchange fluid flowable in heat exchange relation to heat or cool the header.

3. The system of claim 2 wherein heating or cooling the header effects corresponding heating or cooling of the header heat transfer fluid.

4. The system of claim 2 wherein heating or cooling the header effects corresponding heating or cooling of fluid in the wellhead.

5. The system of claim 1 further comprising the earth heat exchange system fluid flowable in heat exchange relation to heat or cool the pipe.

6. The system of claim 2 wherein heating or cooling the header effects corresponding heating or cooling of fluid in the pipe.

7. The system of claim 1 further comprising
    a central facility in fluid communication with the header.

8. The system of claim 7 further comprising
    the earth heat exchange system fluid flowable in heat exchange relation to heat or cool the central facility.

9. The system of claim 8 wherein heating or cooling the header effects corresponding heating or cooling of fluid in the central facility.

10. The system of claim 9 wherein the fluid in the central facility is header heat exchange transfer fluid flowing to and through the central facility.

11. A system for heating or cooling a plurality of wellheads of producing wells, the system comprising
    a header in fluid communication via a plurality of pipes with each wellhead of the plurality of wellheads so that header heat transfer fluid is flowable from the header to the wellheads and back to the header,
    an earth heat exchange system with earth heat exchange fluid flowable therethrough to provide heat exchange between the earth heat exchange fluid and the earth, and
    the earth heat exchange fluid flowable in heat exchange relation to heat or cool each wellhead.

12. A method for heating or cooling at least one wellhead of a producing well, the method comprising
    flowing earth heat exchange fluid of a system in heat exchange relation to effect heating or cooling of the at least one wellhead, the system comprising a header in fluid communication via a pipe with a wellhead so that header heat transfer fluid is flowable from the header to the wellhead and back to the header, an earth heat exchange system with earth heat exchange fluid flowable therethrough to provide heat exchange between the earth heat exchange fluid and the earth, and the earth heat exchange fluid flowable in heat exchange relation to heat or cool the wellhead.

13. The method of claim 12 wherein the at least one wellhead is a plurality of wellheads each in fluid communication with the header.

* * * * *